United States Patent
Shimodaira

(10) Patent No.: US 12,112,640 B2
(45) Date of Patent: Oct. 8, 2024

(54) VEHICLE MANAGEMENT SYSTEM AND VEHICLE MANAGEMENT METHOD

(71) Applicants: Nissan Motor Co., Ltd., Kanagawa (JP); RENAULT S.A.S., Boulogne-Billancourt (FR)

(72) Inventor: Seiji Shimodaira, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 811 days.

(21) Appl. No.: 17/251,556

(22) PCT Filed: Jun. 12, 2018

(86) PCT No.: PCT/IB2018/000825
§ 371 (c)(1),
(2) Date: Dec. 11, 2020

(87) PCT Pub. No.: WO2019/239175
PCT Pub. Date: Dec. 19, 2019

(65) Prior Publication Data
US 2021/0248911 A1      Aug. 12, 2021

(51) Int. Cl.
   *G08G 1/00*      (2006.01)
   *G01C 21/34*     (2006.01)
   (Continued)

(52) U.S. Cl.
   CPC ......... *G08G 1/202* (2013.01); *G01C 21/3438* (2013.01); *G06F 16/29* (2019.01); *G08G 1/0129* (2013.01)

(58) Field of Classification Search
   CPC .............. G08G 1/202; G08G 1/0129; G08G 1/096775; G08G 1/096833; G08G 1/127; G01C 21/3438; G06F 16/29; G06Q 50/30
   (Continued)

(56) References Cited

U.S. PATENT DOCUMENTS 9,562,785 B1 *   2/2017   Racah ................ G01C 21/3438
10,168,168 B2 *  1/2019   Rakah ................... G08G 1/123
(Continued)

FOREIGN PATENT DOCUMENTS

CN    107948290 A    4/2018
JP    2002183892 A   6/2002
(Continued)

*Primary Examiner* — Tuan C To
*Assistant Examiner* — Dominick Mulder
(74) *Attorney, Agent, or Firm* — Osha Bergman Watanabe & Burton LLP

(57) ABSTRACT

A vehicle management system (1) for managing a plurality of vehicles shared by a plurality of users, comprising: a controller (10) for accepting a use request for using the vehicle from the user and managing vehicle dispatch; and a database (20) for storing the use request including a departure place and a destination of the vehicle designated by the user, wherein the controller (10) calculates a required time for the vehicle to arrive at the destination designated by a first user who has made the use request as a first time, calculates a time which is a longer time than the first time and is a time to present to the first user, as a second time, calculates an available area for ride-sharing based on the service capacity, accepts the use request from the second user, and when the departure place designated by the second user is within the available area for ride-sharing, has the vehicle pass through the departure place designated by the second.

13 Claims, 7 Drawing Sheets

(51) Int. Cl.
*G06F 16/29* (2019.01)
*G08G 1/01* (2006.01)

(58) Field of Classification Search
USPC .............................................. 701/2
See application file for complete search history.

(56) References Cited

U.S. PATENT DOCUMENTS

| | | |
|---|---|---|
| 10,895,463 B1* | 1/2021 | Cope .................... G06Q 10/02 |
| 2003/0006914 A1 | 1/2003 | Todoriki |
| 2013/0158861 A1* | 6/2013 | Lerenc ............... G01C 21/3438 |
| | | 701/410 |
| 2014/0207375 A1* | 7/2014 | Lerenc ............... G01C 21/3626 |
| | | 701/527 |
| 2015/0278712 A1* | 10/2015 | Fujita ............... G06Q 10/06311 |
| | | 705/5 |
| 2016/0138928 A1* | 5/2016 | Guo ........................ G06F 16/29 |
| | | 701/537 |
| 2017/0270447 A1* | 9/2017 | Borean ................. H04W 4/023 |
| 2018/0266844 A1* | 9/2018 | Heo ................... G01C 21/3461 |
| 2018/0315022 A1* | 11/2018 | Yamamoto ........ G06F 16/90335 |
| 2018/0349825 A1* | 12/2018 | Yamamoto ............. G08G 1/202 |
| 2019/0043121 A1* | 2/2019 | Barnes ................. G06Q 20/127 |
| 2019/0087875 A1* | 3/2019 | Morioka ............ G01C 21/3438 |
| 2020/0175558 A1* | 6/2020 | Fujimoto ........... G01C 21/3453 |
| 2020/0175633 A1* | 6/2020 | Fujimoto ........... G01C 21/3697 |

FOREIGN PATENT DOCUMENTS

| | | |
|---|---|---|
| JP | 2003021522 A | 1/2003 |
| JP | 2004-295576 A | 10/2004 |

* cited by examiner

VEHICLE MANAGEMENT SYSTEM AND VEHICLE MANAGEMENT METHOD

TECHNICAL FIELD

The present invention relates to a vehicle management system and a vehicle management method for managing vehicles used by a plurality of users.

BACKGROUND ART

There is known a vehicle dispatch management method and a vehicle dispatch system for calculating an estimated required time or an estimated required cost until all the customers are transported based on road traffic information and determining a travel route that minimizes the estimated required time or an estimated required cost when a transport request is received from another customer during the transportation of customers, etc (Patent Document 1: JP 2002-183892 A). This method and system assign vehicle to the customer or client making the transfer request when the customer or client accepts an increase in time relative to the original required time and a reduced fee corresponding to the increase in time.

PRIOR ART DOCUMENT

Patent Document

[Patent Document 1] JP 2002-183892 A.

SUMMARY OF INVENTION

Problems to be Solved by Invention

In the prior art, when the ride-sharing is established by the acceptance of the user, the required time to the destination designated by the user who has accepted the ride-sharing increases, and therefore, arrivals at the destination are delayed each time the ride-sharing is established. In addition, when there is a user who does not accept a transfer request from another user in order to avoid a delay in arrival at the destination, a vehicle other than the optimum vehicle is assigned to the another user, and there is a possibility that the arrival at the destination is delayed. As a result, in the prior art, there is a problem that both the user who accepts the ride-sharing and the user who requests the ride-sharing are dissatisfied, the use opportunity of the system is reduced, and the vehicle dispatch efficiency is lowered.

A problem to be solved by the present invention is to provide a vehicle management system and a vehicle management method capable of suppressing user's dissatisfaction to increase an opportunity to use the system and improving a vehicle dispatch efficiency.

Means for Solving Problems

The present invention solves the above problem through calculating a required time for the vehicle to arrive at the destination designated by a first user who has made the use request as a first time, calculating a time which is a longer time than the first time and is a time to present to the first user, as a second time, calculating a time difference between the first time and the second time as service capacity, calculating an available area for ride-sharing based on the service capacity, accepting the use request from the second user, and when the departure place designated by the second user is within the available area for ride-sharing, having the vehicle pass through the departure place designated by the second user.

Effect of Invention

According to the present invention, while ensuring that the vehicle arrives at the destination designated by the first user within the second time, it is possible for the second user to share a ride, thereby suppressing user's dissatisfaction and increasing the use opportunity of the system and improving the vehicle dispatch efficiency.

MODE(S) FOR CARRYING OUT THE INVENTION

Hereinafter, embodiments of the present invention will be described with reference to the drawings.

First Embodiment

Hereinafter, a vehicle management system according to an embodiment of the present invention will be described with reference to the drawings. In the present embodiment, the vehicle management system will be described by using an example in which the vehicle management system is applied to a vehicle management system that manages and operates a car sharing system configured such that a plurality of users shares a plurality of vehicles allocated to a plurality of stations. In the car sharing system of the present embodiment, the station from which a shared vehicle is rented and the station to which the shared vehicle is returned may be or may not be the same. Each station represents a location at which shared vehicles can be parked, rented and returned and shared vehicles not in use can be on standby. Examples of such a station include a parking area prepared for the car sharing system.

Figure 1:
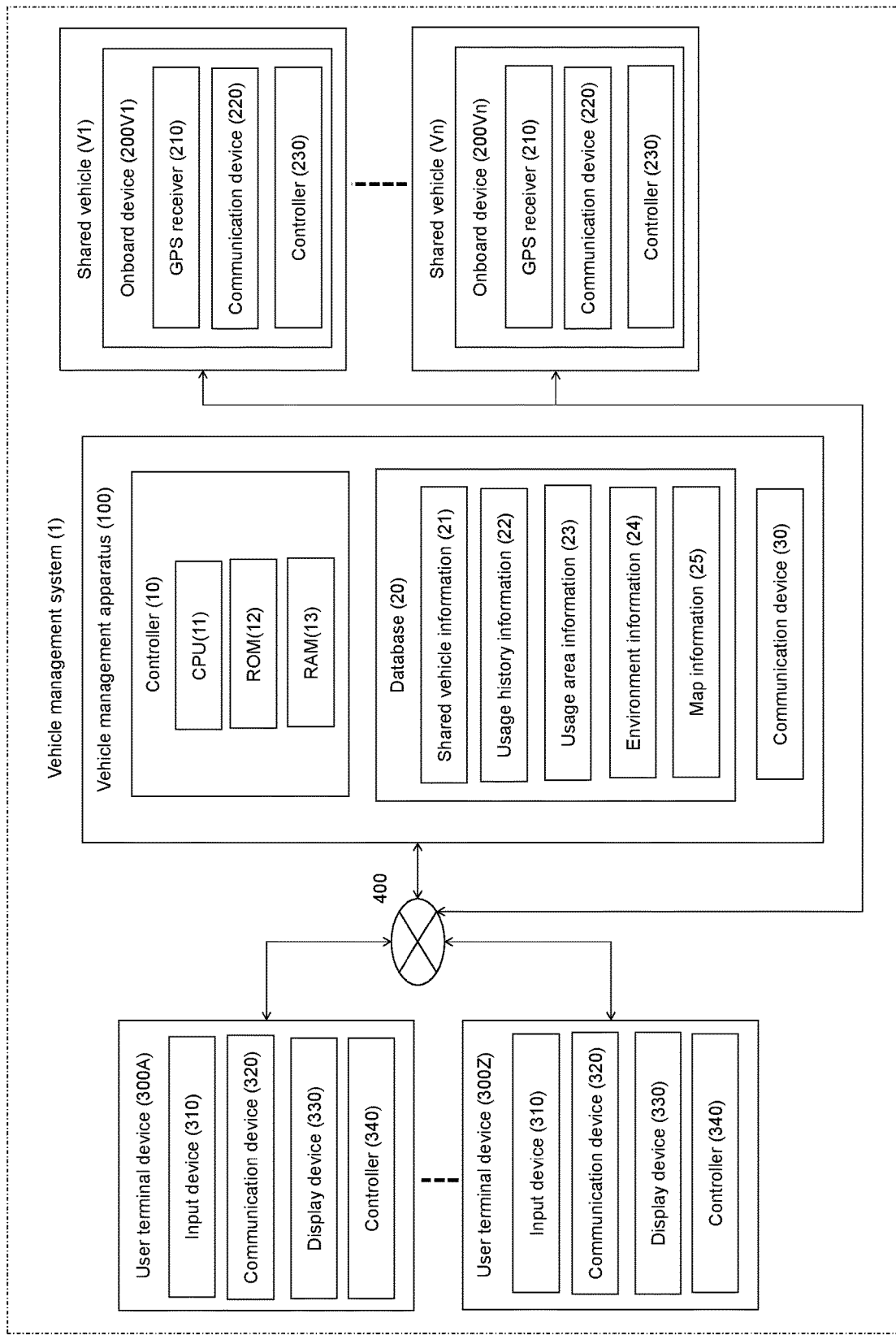
FIG. 1 is a configuration diagram of a vehicle management system according to the present embodiment.

FIG. 1 is a configuration diagram showing a vehicle management system 1 of the present embodiment. As shown in FIG. 1, the vehicle management system 1 of the present embodiment includes a vehicle management apparatus 100, onboard devices 200V1 to 200Vn (which may be collectively referred to as an "onboard device 200V," hereinafter) carried respectively by shared vehicles V1 to Vn (which may be collectively referred to as a "shared vehicle V," hereinafter) used by the users, and user terminal devices 300A to 300Z (which may be collectively referred to as a "user terminal device 300," hereinafter) carried by the users. The numbers of onboard devices 200V1 to 200Vn and user terminal devices 300A to 300Z, which constitute the vehicle management system 1 of the present embodiment, are not limited.

The vehicle management apparatus 100, the onboard devices 200V1 to 200Vn, and the user terminal devices 300A to 300Z include respective communication devices (20, 220, and 320) and can exchange information with one another via an electric communication network, such as the Internet 400. The communication path may be wired or wireless. The communication standards used in the communication performed between the respective apparatuses/devices include 4G/LTE, Wifi, or the like.

The user terminal device 300 of the present embodiment is a computer comprising a read only memory (ROM) that stores programs applied to the user terminal device 300A according to the present embodiment of the present invention, a central processing unit (CPU) as an operation circuit that executes the programs stored in the ROM to perform each function, and a random access memory (RAM) that serves as an accessible storage device. The user terminal device 300 of the present embodiment may be a personal computer, a smartphone, a personal digital assistant (PDA), or other handheld terminal device.

The user terminal device 300 of the present embodiment comprises an input device 310 that receives input information for requesting use of the shared vehicle V by each user, a communication device 320 that performs communication with external devices such as the vehicle management apparatus 100, a display device 330 for notifying each user of the information, and a controller 340 that executes a control process for the use of the shared vehicle V by the user.

As the input device 310 of the user terminal device 300, for example, a device with which the user can input data by manual operation, such as a touch panel disposed on the display screen or a joystick, and/or a device with which the user can input data by voice, such as a microphone, can be used.

The display device 330 notifies the user of the information received from the vehicle management apparatus 100. Examples of the display device 330 include a display. When a touch panel display is used, it can serve as both the display device 330 and the input device 310. The display device 330 receives information on the travel route of the shared vehicle V and relevant information from the shared vehicle management apparatus 100, for example, and notifies the user of the received information.

The controller 340 uses a position acquisition device, such as a global positioning system (GPS) receiver (not illustrated), equipped in the user terminal device 300 to acquire information on the current position of the user who operates the user terminal device 300. Examples of the information on the current position include information on the latitude and longitude. The controller 340 transmits the acquired information on the current position to the vehicle management apparatus 100 via the communication device 320. In the present embodiment, the controller 340 periodically transmits the information on the current position of each user to the vehicle management apparatus 100. This allows a controller 10 of the vehicle management apparatus 100, which will be described later, to acquire the current positional information of each user.

The controller 340 receives input information, such as a use request for requesting use of the shared vehicle V by each user, and transmits the received input information to the vehicle management apparatus 100 via the communication device 320.

The above-described use request includes user's ID information, information on the departure place of the vehicle designated by the user, information on the destination of the vehicle designated by the user, information on the current position of the user, and the like. The departure place of the vehicle designated by the user refers to a boarding location at which the user gets on the shared vehicle V while the destination of the vehicle designated by the user refers to a deboarding location at which the user gets off the shared vehicle V. The user's ID information includes the gender and age of the user registered in advance.

In the present embodiment, one or both of the user terminal device 300 and the onboard device 200V may serve as a navigation device for guiding a travel route of the shared vehicle V to the user. When the user terminal device 300 serves as a navigation device, the user terminal device 300 may preliminarily store map information, for example, in a memory such as a ROM of the user terminal device 300. The user terminal device 300 may receive the travel route and the estimated required time calculated by the vehicle management apparatus 100. The user terminal device 300 may display on the display device 330 the current position of the shared vehicle V which is currently used by the user and the position of the destination of the shared vehicle V, together with the map information, and guide the travel route from the current position of the shared vehicle V to the destination.

Examples of the shared vehicle V of the present embodiment include an electric car equipped with an electric motor as the drive source, an engine car equipped with an internal combustion engine as the drive source, and a hybrid car equipped with both an electric motor and an internal combustion engine as the drive sources. The electric cars and hybrid cars equipped with electric motors as the drive sources include those in which secondary batteries are used as power sources for the electric motors and those in which fuel cells are used as power sources for the electric motors. Further, the shared vehicle V may be a vehicle that travels by the driver's operation, may be a vehicle that travels by an automatic operation in which the onboard device 200V executes when the driver is in the shared vehicle. Furthermore, the shared vehicle V may be a vehicle that travels by automatic operation in which the onboard device 200 executes when no one is in the shared vehicle. The technique known at the time of filing of the present application can be suitably used as the technique for automatically operating. Incidentally, the art to drive automatically includes at least a function to avoid interference with other vehicles and objects, a function to stop control of automatic driving when there is an operation intervention from a driver or the like, and a function to operate in compliance with traffic laws.

The onboard device 200V of the present embodiment comprises a GPS receiver 210 that detects the current position of each shared vehicle V, a communication device 220 that performs communication with external devices such as a vehicle management apparatus 100, and a controller 230 that executes a control process of the use of the shared vehicle V by the user.

The controller 230 acquires the information on the shared vehicle V from each device provided in the onboard device 200V, and transmits the acquired information on the shared vehicle V to the vehicle management apparatus 100 via the communication device 220. The information on the shared vehicle V includes information on the current position acquired by the GPS receiver 210, information on the vehicle speed of the shared vehicle V detected by the vehicle speed sensor (not shown). Further, the information on the shared vehicle V includes the information on current usage situation of the shared vehicle V. Examples of the usage situation of the shared vehicle V include the situation where a user is being picked up and dropped off, and the situation where other users can share a ride, or the like. The information on the shared vehicle Vis not limited to the information described above, and may include, for example, the remaining power capacity and failure information of each shared vehicle V, and the like.

Further, the controller 230 notifies the user of the information transmitted from the vehicle management apparatus 100 and other information, such as using a display (not shown) or a speaker (not shown). In the present embodiment, the controller 230 receives information regarding users who desire to share a ride on the shared vehicle V, the travel route of the shared vehicle V, a the estimated required time, and other information from the vehicle management apparatus 100 and notifies the user of the received information. The ride-sharing and other similar terms as used in the present embodiment refer to a situation in which two or more persons get on one shared vehicle V and, for example, refer to a situation in which a user and one or more other users get on one shared vehicle V.

In the present embodiment, like the above-described user terminal device 300, the onboard device 200V may also serve a navigation device for guiding the travel route from the current position of the shared vehicle V to the destination.

The vehicle management apparatus 100 of the present embodiment comprises a controller 10, a database 20, and a communication device 30.

The communication device 30 is a device capable of mutually communicating with the onboard device 200V and the user terminal device 300. The communication device 30 outputs the information received from the onboard device 200V to the controller 10, and transmits the information input from the controller 10 to the onboard device 200V and the user terminal device 300. Each piece of information will be described later.

In addition, the communication device 30 communicates with the road traffic information communication system VICS (registered trademark) (Vehicle Information and Communication System), a server that provides information on weather, such as a weather forecast, or the like, and a server that provides map information or road information. The communication device 30 outputs the information received from the VICS and the server that provides various information to the database 20. The information received by the communication device 30 includes traffic jam information, traffic obstacle information, traffic control information, construction information, weather information, map information, and road information. In addition, the communication device 30 outputs the information on the use request of the shared vehicle V and on the usage histories of the shared vehicle V, among the information transmitted from the user terminal device 300, to the database 20. Further, the communication device 30 outputs the information transmitted from the onboard device 200V to the database 20.

The database 20 stores shared vehicle information 21, usage history information 22, usage area information 23, environment information 24, and map information 25. Although not shown, the database 20 stores use requests transmitted from the user terminal device 300 for the processing to be executed by the controller 10 which will be described later.

The shared vehicle information 21 is information on the shared vehicle V transmitted from the shared vehicle V. The shared vehicle information 21 includes information on the current position of each shared vehicle V, information on the vehicle speed of each shared vehicle V, information on the current usage situation of each shared vehicle V, and the like. The shared vehicle information 21 is updated each time the communication device 30 receives the shared vehicle information 21 from the shared vehicle V.

The usage history information 22 is a record when the user has used the shared vehicle V in the past. The usage history information 22 includes attributes (gender and age) of the user, areas where the user has used the shared vehicle V, departure places and destinations designated by the user, travel distances of the shared vehicle V from the departure place to the destination, the required time for the shared vehicle V to arrive at the destination, and the satisfaction level of the user for the required time. Since these information are linked to the user's ID information, the database 20 stores the usage history information 22 for each user. The area in which the user has used the shared vehicle Vis indicated by the name of the area, region, and city in which the shared vehicle V has traveled from the departure place to the destination. The area in which the user has used the shared vehicle V may be indicated at the nearest station of various railways within a predetermined range from the travel route travelled by the shared vehicle V.

Here, the satisfaction level for the required time will be described. The satisfaction level for the required time is an indicator of how satisfied the user is with the time it took to arrive at the destination. For example, the vehicle management apparatus 100 can acquire the satisfaction level for the required time by conducting a questionnaire to the user after using the shared vehicle V. For example, after the user finished to use the shared vehicle V, the vehicle management apparatus 100 transmits to the user terminal device 300 the information on the satisfaction level questionnaire along with information on the required time to arrive at the destination. When the user answers the questionnaire via the input device 310, the user terminal device 300 transmits the result of the questionnaire to the vehicle management apparatus 100. As an example of the answer form of the questionnaire, the form having the user choose from the choices to which the score is tied beforehand, such as "Great satisfaction", "Satisfaction", "Ordinary", "Dissatisfaction", and "Great dissatisfaction", or the form of having the user enter the score with the score with the score being a full score. For example, when there is a traffic jam or accident on or around the route to the destination, and the time arrived at the destination is later than the initial estimated time, the user answers with the satisfaction level for the required time in consideration of these circumstances. In other words, the satisfaction level for the required time can also be referred to as an indicator of how much delay is sensitively tolerated by the user.

In addition, the required time when the user answers the satisfaction level may include the waiting time of the user from the time the user makes a use request until the shared vehicle V arrives at the departure place. It should be noted that the required time is not limited to including the waiting time, and, for example, may be divided into the required time before boarding and a the required time from the departure place to the destination, and the user may answer the satisfaction level to each of them. In this case, the usage history includes the required time from departure place to the destination and the user's the satisfaction level for the required time, and the user's waiting time at the departure place and the user's the satisfaction level for the waiting time.

The usage area information 23 is information on a history in which the user has used moving means other than the shared vehicle V in the past. Examples of moving means other than the shared vehicle V (hereinafter, also referred to as other moving means) include public transportation such as railways and buses, and taxis. The usage area information 23 includes attributes of the user, areas where the user has used other moving means, the required time until the user has arrived at the destination using other moving means, and the satisfaction level for the required time are included, as well as the usage history information 22. These information are linked to the user's ID information as well as the usage history information 22. These information is not limited to being directly acquired from the user, and for example, statistical data may be used.

The environment information 24 is traffic jam information and weather information received by the communication device 30. The environment information 24 is updated each time the communication device 30 receives the information.

The map information 25 is map information and road information for the controller 10 to calculate the travel route of the shared vehicle V. The map information and road information are information represented by combinations of link and node. The map information 25 is updated each time the communication device 30 receives the information.

The controller 10 functions as a server of the vehicle management system 1, and executes a control process for managing and operating the car sharing system. The controller 10 comprises a read only memory (ROM) 12 that stores programs for executing processes to manage and operate the car sharing system, a central processing unit (CPU) 11 as an operation circuit that executes the programs stored in the ROM 12 to serve as the vehicle management apparatus 100, and a random access memory (RAM) 13 that serves as an accessible storage device.

The controller 10 achieves a use reception function, a shared vehicle selection function, a travel route calculation function, a first time calculation function, a second time calculation function, a second time presentation function, a service capacity calculation function, a ride-sharing availability determination function, an available area for ride-sharing calculation function, a travel route update function and a notification function. The controller 10 is a computer that realizes each function by cooperation of software for achieving the above functions and the above-described hardware. The above functions achieved by the controller 10 will be described below.

First, the use reception function will be described. The controller 10 uses the use reception function to sequentially acquire use requests for requesting use of a shared vehicle V from users via the user terminal device 300. The use request includes information on a departure place and a destination designated by the user. For example, the user inputs to the input device 310 in the user terminal device 300 the departure place as a location at which the user gets on the shared vehicle V and the destination as a location at which the user gets off the shared vehicle V. The user terminal device 300 transmits the input information to the vehicle management device 100 via the communication device 320. The information transmitted from the user terminal device 300 to the vehicle management device 100 may include not only user requests of the user but also user's ID information registered in advance and information on the user's current position.

Next, the shared vehicle selection function will be described. The controller 10 uses the shared vehicle selection function to allocate a shared vehicle V that is suitable for the user who made the use request from among a plurality of shared vehicles V, based on the shared vehicle information 21 and the use request from the user. The controller 10 selects a shared vehicle V that can travel to the destination via the departure place by comparing the current position and the current usage situation of each shared vehicle V included in the shared vehicle information 21 with the departure place and the destination designated by the user. For example, the controller 10 searches for a station located at the shortest distance from the departure place designated by the user. Then, the controller 10 selects a shared vehicle V that is not scheduled to be used from among the shared vehicles V that are parked at the corresponding station and assign selected shared vehicle V to the user who made the use request. Further, for example, the controller 10 searches for a shared vehicle V that travels the shortest distance from the user's current position, and confirms the current usage situation of the corresponding shared vehicle V. Then, the controller 10, when it is determined that the user is available based on the current usage situation, assigns the shared vehicle V located closest to the user's current position, to the user who made the use request.

Next, the travel route calculation function will be described. The controller 10 uses the travel route calculation function to calculate the travel route in which the shared vehicle V travels. For example, the controller 10 refers to the map information and the road information included in the map information 25, and calculates the travel route from the current position of the shared vehicle V to the destination designated by the user through the departure place designated by the user.

Next, the first time calculation function will be described. The controller 10 uses the first time calculation function to calculate the required time for the shared vehicle V to arrive at the destination designated by the user. In the present embodiment, the controller 10 sets the required time for the shared vehicle V to arrive at the destination (hereinafter, also referred to as the first time), which is the sum of the required time for the shared vehicle V to arrive at the departure place designated by the user from the current position and the required time for the shared vehicle V to arrive at the destination from the departure place.

For example, when the shared vehicle V is parked at the station, the controller 10 calculates the required time to the departure place by dividing the distance from the current position of the shared vehicle V to the departure place designated by the user by the legal speed of the road specified in the travel route. Further, for example, the controller 10 calculates the required time from the departure place to the destination by dividing the distance from the departure place to the destination by the legal speed of the road specified in the travel route.

Further, when the shared vehicle V is traveling, the controller 10 estimates the estimated vehicle speed of the shared vehicle V based on the current vehicle speed transmitted from the shared vehicle V, taking into account the traffic jam information and weather information included in the environment information 24. For example, the controller 10 estimates the vehicle speed decelerated by a predetermined rate with respect to the current vehicle speed as an estimated vehicle speed when there is a traffic jam in the travel route from the current position to the destination through the departure place designated by the user or in the surrounding route. Also, for example, the controller 10, when the weather is rainy, estimates the vehicle speed decelerated by a predetermined ratio with respect to the current vehicle speed as an estimated vehicle speed, based on the viewpoint that the driver of the vehicle generally limits the speed. Then, the controller 10 calculates the required time to the departure place by dividing the distance from the current position to the departure place by the estimated vehicle speed, and calculates the required time from the departure place to the destination by dividing the distance from the departure place to the destination by the estimated vehicle speed. In this way, the required time to the destination designated by the user can be accurately calculated by taking into account the current traffic jam information and weather information. The method of estimating the vehicle speed is only an example, and is not limited to the above method. For example, the estimated vehicle speed may be estimated for each section by dividing the travel route into a plurality of sections.

Next, the second time calculation function will be described. The controller 10 uses the second time calculation function to calculate a time to present to the user who made a use request, which is longer than the first time. The time to be presented to the user is the provisional time presented to the user who made a use request as the required time to the destination. By the second time presentation function of the controller 10 described below, the use who made a use request is presented with a time longer than the first time (hereinafter, also referred to as the second time). The user confirms the presented second time and decides whether or not to use the shared vehicle V.

Specifically, the method of calculating the second time will be described. First, the controller 10 refers to the map information 25 to calculate the distance from the departure place designated by the user to the destination designated by the user. Next, the controller 10 acquires usage histories of the shared vehicle V when the user who has made the use request used the shared vehicle V in the past from the database 20. For example, the controller 10 retrieves the user's ID information who has made the use request from the user's ID information included in the usage history information 22, and acquires the usage histories associated with the ID information of the corresponding user. At this time, when the user has used the shared vehicle V a plurality of times in the past, the controller 10 acquires all the usage histories. In the following, the case where the user who has made the use request uses the shared vehicle V a plurality of times will be described.

Next, the controller 10 extracts, from among the plurality of usage histories, the usage histories which include the same level of travel distance as the distance that the shared vehicle V is scheduled to travel in the future. For example, the controller 10 extracts, from the plurality of usage histories, usage histories in which the difference between the travel distance included in the usage histories and the distance from the departure place to the destination currently designated by the user is within a predetermined distance. The predetermined distance is not particularly limited, and may be a predetermined distance in advance or a distance experimentally obtained. Incidentally, in the comparison processing between the travel distance in the past and the travel distance in the future, it is not considered for the area where the shared vehicle V has traveled. For example, even if the area including the departure place and the destination currently designated by the user and the area where the user has used the shared vehicle V in the past are different, the controller 10 extracts the usage histories regardless of the area when the same level of the travel distance as the distance that the shared vehicle V is expected to travel from now on is included.

Then, the controller 10 acquires the required time to the destination and the satisfaction level answered by the user from the extracted usage histories. For example, when there is only one extracted usage history, the controller 10 acquires the required time and the satisfaction level included in the extracted usage history. Further, for example, when there are a plurality of extracted usage histories, the controller 10 further selects the usage histories of which the satisfaction level is equal to or larger than a predetermined value, and acquires the usage history including the longest the required time among the selected usage histories. Through this process, the controller 10 can acquire the longest travel time in which a satisfaction level is equal to or larger than predetermined value. Even if the required time to the destination is long, the travel time when the user is satisfied with the travel time is calculated as an acceptable travel time to some extent.

Further, the controller 10 uses the second time calculation function to execute the same processing as the above-described processing for the waiting time at the departure place. For example, the controller 10 acquires the required time until the user gets on the shared vehicle V (also referred to as waiting time) and the satisfaction level for the waiting time from the usage histories extracted based the travel distance. For example, when there is only one extracted usage history, the controller 10 acquires the waiting time and the satisfaction level included in the extracted usage history. Further, for example, when there are a plurality of extracted usage histories, the controller 10 further selects the usage histories of which the satisfaction level is equal to or larger than a predetermined value, and acquires the usage history including the longest waiting time among the selected usage histories. Through this process, the controller 10 can acquire the longest waiting time in which the satisfaction level is equal to or larger than a predetermined value. Even if the waiting time to get on the shared vehicle Vis long, the waiting time when the user is satisfied is calculated as an acceptable waiting time to some extent.

After the above two processes are completed, the controller 10 uses the second time calculation function to calculate the sum of the longest required time to the destination and the longest waiting time at the departure place as the second time. Further, the controller 10 compares the calculated second time and the first time calculated by the first time calculation function, when the second time is longer than the first time, determines the calculated second time. On the other hand, when the second time is shorter than the first time, the controller 10 discards the calculated second time and replaces the first time with the second time.

The controller 10 may correct the second time calculated by the second time calculation function based on at least one of the time zone in which the user made a use request and the weather when the vehicle is used. Specifically, the controller 10 corrects the second time to be longer or to be shorter in accordance with the time zone or the weather. For example, since the use of the shared vehicle V is limited in a limited time zone such as a lunch time, the controller 10 corrects the second time to be shorter when the time zone in which the use request is made corresponds to the lunch time. Further, for example, since the user wants to shorten the waiting time at the departure place when the weather is rainy, the controller 10 corrects the second time to be shorter when the weather at the time the use request is made corresponds to rainy. In the correction to shorten the second time described above, the controller 10 performs correction in a range not shorter than the first time. The standard of correction and the method of correction are only examples, and are not particularly limited.

Next, the second time presentation function will be described. The controller 10 uses the second time presentation function to present the second time calculated by the second time presentation function to the user who made the use request via the user terminal device 300. The controller 10 uses the second time presentation function to present not only the second time, but also the information on the shared vehicle V selected for the use request (e.g., the type of vehicle, information of colors, the number of passengers able to ride). The controller 10 may also present a detailed time configuration of the second time. For example, the controller 10 may present to indicate that the second time includes a waiting time at the departure place and a required time from the departure place to the destination. The user confirms the presented second time and determines whether or not to accept the use of the shared vehicle V. For example, when the user determines that there are no problems at the second time as the required time to the destination, the user selects "accept" displayed on the display device 330. On the other hand, when the user determines that there is a problem at the second time, the user selects "do not accept" displayed on the display device 330. The information selected by the user is transmitted to the vehicle management apparatus 100 via the communication device 320. When the user accepts the second time, the use of the shared vehicle between the user who made the use request and the vehicle management apparatus 100 is established. The function of the controller 10, which will be described later, is executed after the use of the shared vehicle Vis established.

Next, the service capacity calculation function will be described. The controller 10 uses the service capacity calculation function to calculate the time difference between the first time and the second time as the service capacity. The service capacity is a time difference between the second time presented to the user and accepted by the user and the first time estimated as the required time to the destination. Since the user accepted the presented second time, it can take the second time for the shared vehicle V to arrive at the destination designated by the user. That is, the service capacity is a time that can be spent by the shared vehicle V for a purpose other than traveling to the destination before the shared vehicle V arrives at the destination along the travel route. In the present embodiment, the service capacity is the time that can be spent on the ride-sharing of the shared vehicle V. For example, when 10 minutes is calculated as the time difference between the first time and the second time, for up to ten minutes, the shared vehicle V can bypass from the travel route set originally and allow other users to share a ride.

Next, the ride-sharing availability determination function will be described. The controller 10 uses the ride-sharing availability determination function to determine whether or not the shared vehicle V can be shared a ride. The controller 10 determines that other users can share a ride, when the service capacity calculated by the service capacity calculation function exceeds a predetermined time. On the other hand, the controller 10 determines that other users cannot share a ride, when the service capacity is equal to or less than a predetermined time. The predetermined time used for the determination of the ride-sharing possibility may be a predetermined time in advance or may be an experimentally obtained. In the following, for convenience of explanation, a user who has established the use of the shared vehicle V will be referred to as a first user, and a user who will make a use request from now on will be referred to as a second user.

Next, the available area for ride-sharing calculation function will be described. The controller 10 uses the available area for ride-sharing calculation function to calculate an area in which the second user can share a ride on the shared vehicle V based on the service capacity. The controller 10 calculates an area where the shared vehicle V can bypass in accordance with the service capacity based on the travel route calculated by the travel route calculation function. For example, the controller 10 refers to the map information 25, and converts the time calculated as the service capacity into a distance. In this conversion process, the controller 10 may use the information on the vehicle speed transmitted from the shared vehicle V or may use the information on the vehicle speed predetermined. The controller 10 calculates an area based on the calculated travel route and expanded from the travel route in accordance with the converted distance as an available area for ride-sharing. In the available area for ride-sharing, the direction that expands from the travel route is not particularly limited, and may be a direction that deviates from the travel route and bypasses as long as the shared vehicle V can arrive at the destination within the second time. For example, the available area for ride-sharing includes an area which is farther from the departure place than the destination.

Figure 2:
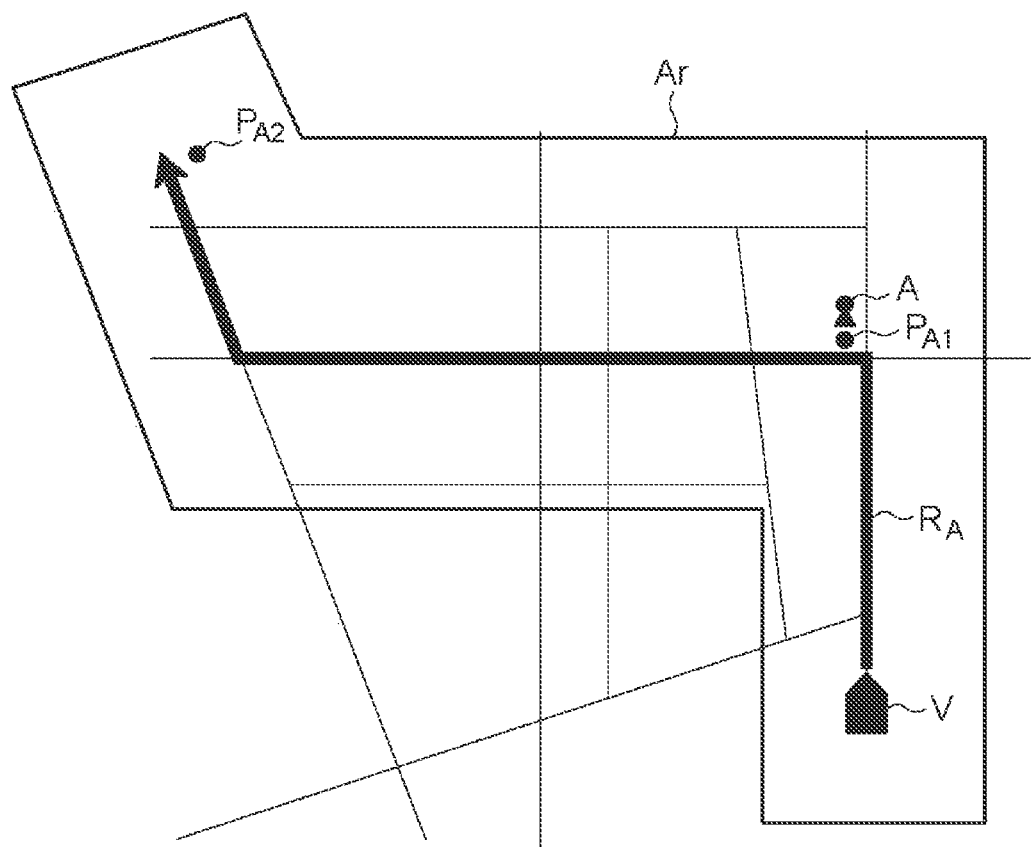
FIG. 2 is a diagram showing an example of an available area for ride-sharing.

FIG. 2 is a diagram showing an example of an available area for ride-sharing. In FIG. 2, a scene in which the user A makes a use request of the shared vehicle V and accepts the presented second time, that is, a scene in which the use of the shared vehicle V is established is shown. In FIG. 2, the controller 10 calculates the travel route $R_A$ to the destination $P_{A2}$ through the departure place $P_{A1}$ designated by the user A. Shared vehicle V is traveling along the travel route $R_A$.

In the scene shown in FIG. 2, the controller 10 calculates the time of the difference between the second time presented as the required time to the destination $P_{A2}$ to the user A and the required time (first time) to the destination $P_{A2}$ estimated based on the traffic jam information or the like, as the service capacity. An available area for ride-sharing $A_r$ indicates an area calculated by the controller 10 based on service capacity, in which the shared vehicle V can still arrive at the destination $P_{A2}$ within the second time presented to the user A, even if the shared vehicle bypasses. In other words, the available area for ride-sharing $A_r$ is an area within which the required time to the destination $P_{A2}$ does not exceed the second time when a different user than the first user is shared a ride on the shared vehicle V.

Figure 3:
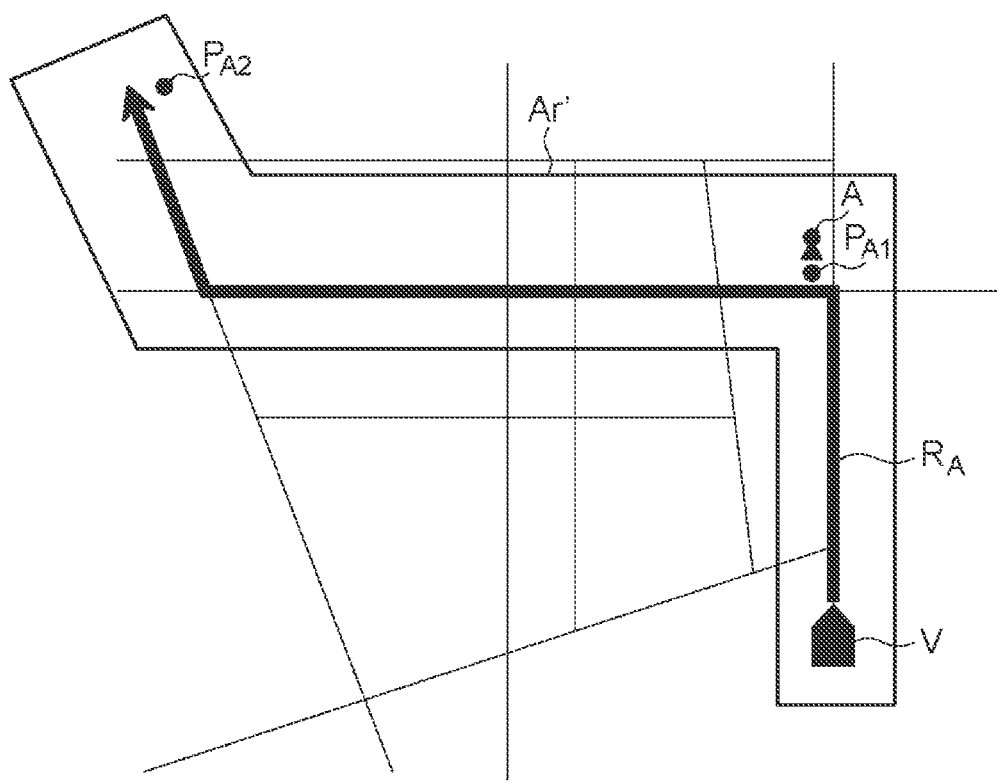
FIG. 3 is a diagram showing another example of an available area for ride-sharing.

FIG. 3 is a diagram showing another example of an available area for ride-sharing. FIG. 3 is the same scene as the scene shown in FIG. 2, but an available area for ride-sharing $A_r'$ differ compared to FIG. 2. The available area for ride-sharing $A_r'$ shown in FIG. 3 shows an area where the second time is corrected to be shorter by the controller 10. When the second time is shortened, since the time of the difference between the second time and the first time is shortened, as shown in FIG. 3, the area where the shared vehicle V can be bypassed is reduced.

Each function of the controller 10 will be described again. Next, the travel route update function will be described. This function is executed when a use request is made by the second user who is different from the first user after the use of the shared vehicle V has established with the first user. First, the controller 10 uses the travel route update function to determine whether or not the second user can share a ride. The controller 10 determines whether or not the second user can share a ride on the shared vehicle V in accordance with the relationship between the available area for ride-sharing and the departure place included in the use request by the second user. The controller 10 determines that the second user is allowed to share a ride when the departure place designated by the second user is within the available area for ride-sharing. On the other hand, the controller 10 determines that the second user cannot share a ride, when departure place designated by the second user is outside the range of the available area for ride-sharing.

Next, the controller 10 uses the travel route update function to update the travel route in order to make the second user share a ride on the shared vehicle V. Specifically, when the departure place designated by the second user is within the available area for ride-sharing, the controller 10 calculates the travel route for the shared vehicle V to bypass the travel route to the destination designated by the first user, through the departure place designated by the second user, and arrive at the destination designated by the first user.

In addition, the controller 10 determines whether or not to calculate a travel route passing through the destination designated by the second user, in accordance with whether or not the destination designated by the second user is within the available area for ride-sharing. For example, when the departure place and the destination designated by the second user are within the available area for ride-sharing, the controller 10 calculates the travel route until the shared vehicle V arrives at the destination designated by the first user through the departure place and the destination designated by the second user. On the other hand, when the departure place designated by the second user is within the available area for ride-sharing and the destination designated by the second user is outside the range of the available area for ride-sharing, the controller 10 calculates the travel route until the shared vehicle V arrives at the destination specified by the first user via only the departure place specified by the second user.

Further, when the first user is not riding on the shared vehicle V, the controller 10 determines the order of passing through the departure place designated by the first user and the departure place designated by the second user in accordance with the positional relationship between the departure place designated by the first user and the departure place designated by the second user. For example, when the departure place designated by the first user is closer to the current position of the shared vehicle V than the departure place designated by the second user, the controller 10 calculates a travel route that passes through the departure place designated by the first user and the departure place designated by the second user in this order. On the other hand, when the departure place designated by the second user is closer to the current position of the shared vehicle V than the departure place designated by the first user, the controller 10 calculates a travel route that passes through the departure place designated by the second user and the departure place designated by the first user in this order.

Next, the notification function will be described. The controller 10 uses the notification function to transmit the updated travel route, the information on the departure place (and the destination) designated by the second user, and the information on the second user (for example, the user's ID information) to the onboard devices 200V and the user terminal devices 300. As a result, the first user and the onboard device 200V can acquire the information on the user who share a ride on the shared vehicle V and the information on the updated travel route. For example, in the case of a vehicle in which the shared vehicle V travels automatically along the travel route set by the vehicle management apparatus 100, the shared vehicle V travels along the updated travel route to ride the second user. The shared vehicle V travels to the destination designated by the first user after the second user rides on the shared vehicle V. Further, for example, when the shared vehicle V is traveled by the driver, the driver drives along the updated travel route to ride the second user. Then, the driver drives to the destination designated by the first user after the second user rides on the shared vehicle V.

Figure 4:
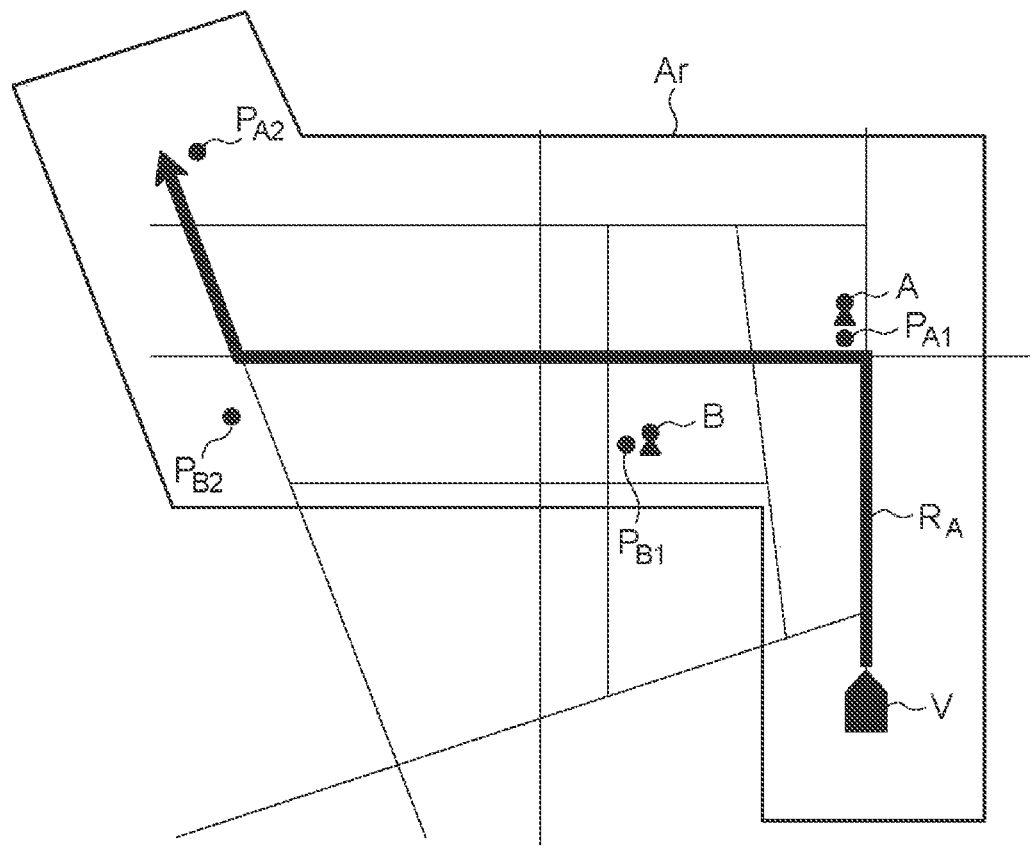
FIG. 4 is a diagram of a scene in which a use request of the second user is accepted in the scene shown in FIG. 2.
Figure 5:
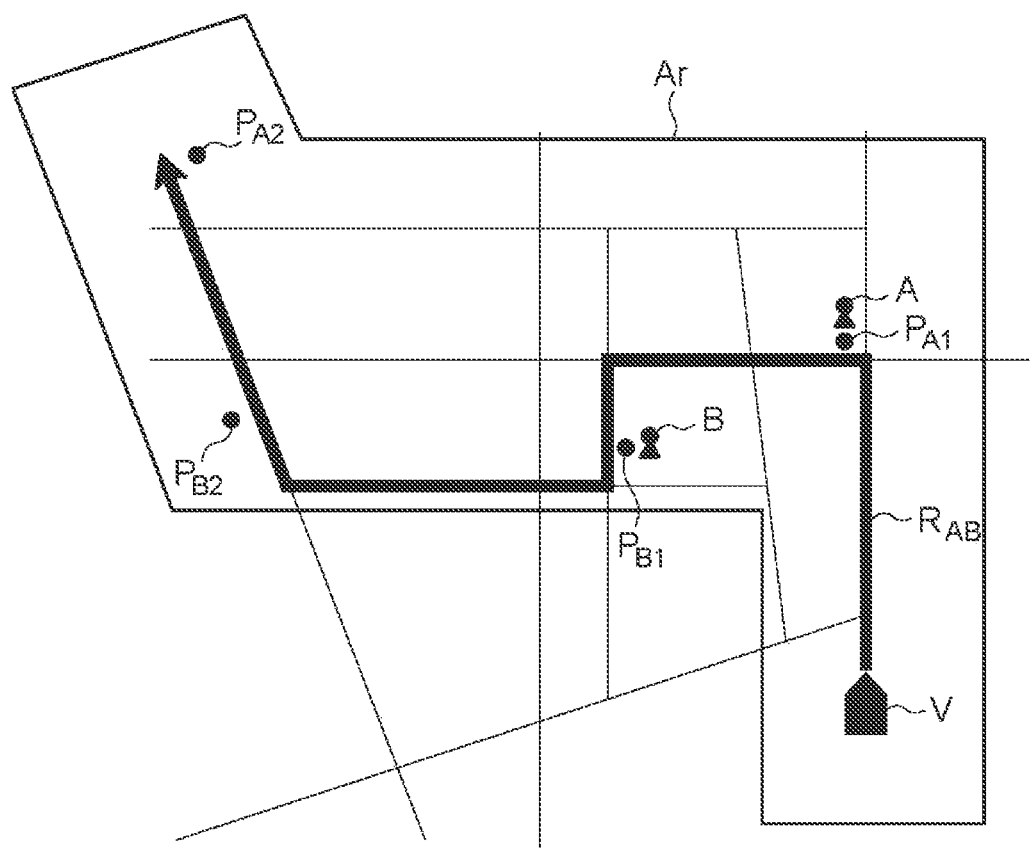
FIG. 5 is a diagram of a scene after a predetermined time has elapsed from the scene shown in FIG. 4, and is a diagram showing an example of an updated travel route.

With reference to FIGS. 4 and 5, the determination of the possibility of ride-sharing and the update of the travel route will be described in detail. FIG. 4 shows a scene in which a use request by the second user is accepted in the scene shown in FIG. 2. In FIG. 4, user B make a use request before the user A gets on the shared vehicle V at the departure place $P_{A1}$. In this scene, the controller 10 compares the available area for ride-sharing $A_r$ with the departure place $P_{B1}$ designated by the user B, determines that the departure place $P_{B1}$ is within the available area for ride-sharing $A_r$, and determines that the user B can share a ride on the shared vehicle V. The controller 10 also compares the available area for ride-sharing $A_r$ with the destination $P_{B2}$ designated by the user B, determines that the destination $P_{B2}$ is within the available area for ride-sharing $A_r$, and determines that it is possible to go to the destination $P_{A2}$ designated by the user A after getting off the user B.

FIG. 5 is a diagram of a scene in which a predetermined time has elapsed from the scene of FIG. 4, and is a diagram showing an example of a travel route updated by the controller 10. As shown in FIG. 5, the controller 10 calculates the updated travel route $R_{AB}$ based on the travel route $R_A$ shown in FIG. 4 when the departure place $P_{B1}$ and the destination $P_{B2}$ designated by the user B are within the available area for ride-sharing $A_r$. The updated travel route $R_{AB}$ is a route to the destination $P_{A2}$ through the departure place $P_{A1}$, the departure place $P_{B1}$, and then the destination $P_{B2}$. In the example of FIG. 5, in the section from the departure place $P_{B1}$ to the destination $P_{B2}$, the user A and the user B share a ride on the shared vehicle V. Since the shared vehicle V arrives at the destination $P_{A2}$ within the second time, even if user B shares a ride, it can restrain the dissatisfaction that user A is given to the ride-sharing by the user B. In addition, since the shared vehicle V makes the user B share a ride before arriving at the destination $P_{A2}$, it is possible to improve the vehicle dispatch efficiency of the shared vehicle V. Further, since the shared vehicle V traveling around the user B is assigned to the user B, it is possible to prevent the shared vehicle V from waiting unnecessarily for the user B after the use request is made, and to restrain dissatisfaction given to the user B.

Subsequently, the control process of the vehicle management system of the present embodiment will be described with reference to FIG. 6 which is a flowchart showing a control procedure of the vehicle management system of the present embodiment. The control process is repeatedly executed at predetermined intervals.

In step S101, the controller 10 acquires a use request from the first user. In step S102, the controller 10 selects shared vehicle V to be assigned to the first user based on the use request acquired in step S101. For example, the controller 10 assigns to the first user a shared vehicle V that is parking or traveling at a point closest to the departure place designated by the first user.

In the step S103, the controller 10 calculates the travel route from the current position of the shared vehicle V selected in the step S102 to the destination acquired in the step S101 through the departure place acquired in the step S101. For example, the controller 10 refers to the map information and the road information included in the map information 25, and calculates the travel route to the destination.

In the step S104, the controller 10 calculates the required time for the shared vehicle V to arrive at the destination when the shared vehicle V travels the travel route calculated in the step S103 as a first time. The first time includes a waiting time for the first user to wait for the shared vehicle V at the departure place, and a travel time of the shared vehicle V from the departure place to the destination. For example, the controller 10 estimates the vehicle speed in consideration of the traffic jam information and weather information included in the environment information 24 as the estimated vehicle speed of the shared vehicle V. Then, the controller 10 calculates the first time by summing the time obtained by dividing the distance from the current position to the departure place of the shared vehicle V by the estimated vehicle speed, and the time obtained by dividing the distance from the departure place to the destination by the estimated vehicle speed.

In the step S105, the controller 10 calculates a time which is longer time than the first time calculated in step S104 and is a time to present to the first user, as a second time. For example, the controller 10 acquires usage histories of the shared vehicle V used by the first user from the database 20. Then, the controller 10 calculates the travel distance from the departure place acquired in the step S101 to the destination acquired in the step S101, and extracts the usage histories of the first user in which the travel distance comparable to the calculated travel distance is recorded. When there are a plurality of usage histories in the extracted result, the controller 10 selects the usage history of which the satisfaction level answered by the first user in the past is equal to or larger than a predetermined value, and extracts the longest travel time among the plurality of travel times from the departure place to the destination location included in the plurality of usage histories.

Further, when the usage histories of the first user includes the waiting time and the satisfaction level for the waiting time, the controller 10 selects the usage histories of which the satisfaction level is equal to or larger than a predetermined value and extracts the longest waiting time among the plurality of waiting times at the departure place included in the plurality of usage histories. The controller 10 calculates the time obtained by adding the longest waiting time to the longest travel time as the second time. Then, the controller 10 transmits the information on the second time, the information on the selected shared vehicle V, and the information on the travel route to the user terminal device 300 possessed by the first user via the communication device 30. The first user confirms various information displayed on the display device 330 in the user terminal device 300.

In step S106, the controller 10 determines whether or not the first user accepted the second time presented in step S105. When the first user inputs the information of acceptance or non-acceptance to the input device 310, the user terminal device 300 transmits the information input by the first user to the vehicle management apparatus 100. When the first user accepted the second time presented by the vehicle management apparatus 100, the process proceeds to step S107, and when the first user did not accept the second time presented by the vehicle management apparatus 100, the control of the vehicle management system is ended.

In step S107, the controller 10 calculates the service capacity. Specifically, the controller 10 subtracts the first time calculated in step S104 from the second time calculated in step S105, thereby acquiring the time difference between the first time and the second time, and sets the time difference as the service capacity.

In the step S108, the controller 10 determines whether or not it is possible to share a ride with the service capacity calculated in step S107. For example, when the time difference between the first time and the second time calculated as the service capacity exceeds a predetermined time set in advance, the controller 10 determines that other users can shared a ride. On the other hand, when the calculated difference time is within a predetermined time, the controller 10 determines that other users cannot shared a ride. When it is determined that the vehicle can be shared a ride, the process proceeds to the step S109, and when it is determined that the vehicle cannot be shared a ride, the control of the vehicle management system is ended.

In step S109, the controller 10 calculates an available area for ride-sharing based on the service capacity calculated in step S107. For example, the controller 10 converts the calculated time difference between the first time and the second time into a distance. In this case, the controller 10 uses the information on the vehicle speed set in advance, or the information on the vehicle speed transmitted from the shared vehicle V. Then, the controller 10 the available area for ride-sharing by expending the converted distance from each point on the travel route calculated in step S103 to a predetermined direction.

In step S110, the controller 10 determines whether or not a use request accepted from the second user different from the first user. When a use request is accepted from the second user, the process proceeds to step S111. When a use request is not accepted from the second user, the process waits at step S110.

In step S111, the controller 10 determines whether or not the departure place designated by the second user is within the available area for ride-sharing. Further, when the departure place of the second user is within the available area for ride-sharing, the controller 10 confirms whether the destination place of the second user is also within the available area for ride-sharing. When the departure place designated by the second user is within the available area for ride-sharing, the process proceeds to step S112, and when the departure place designated by the second user is not within the available area for ride-sharing, the process returns to step S110.

In step S112, the controller 10 calculates the travel route to the destination designated by the first user through the departure place designated by the second user acquired in step S110, and updates the travel route calculated in step S103. For example, when the departure place and the destination designated by the second user are within the available area for ride-sharing, the controller 10 calculates the travel route for the shared vehicle V to arrive at the destination designated by the first user through the departure place and the destination designated by the second user.

In step S113, the controller 10 notifies the first user and the second user of the travel route information updated in step S112. The information notified to the first user by the controller 10 may include not only the information on the travel route but also the information on the second user. The information notified to the second user by the controller 10 may include not only the information on the travel route but also the information on the first user. When the controller 10 finishes the process in the step S113, the control of the vehicle management system is ended.

Figure 6:
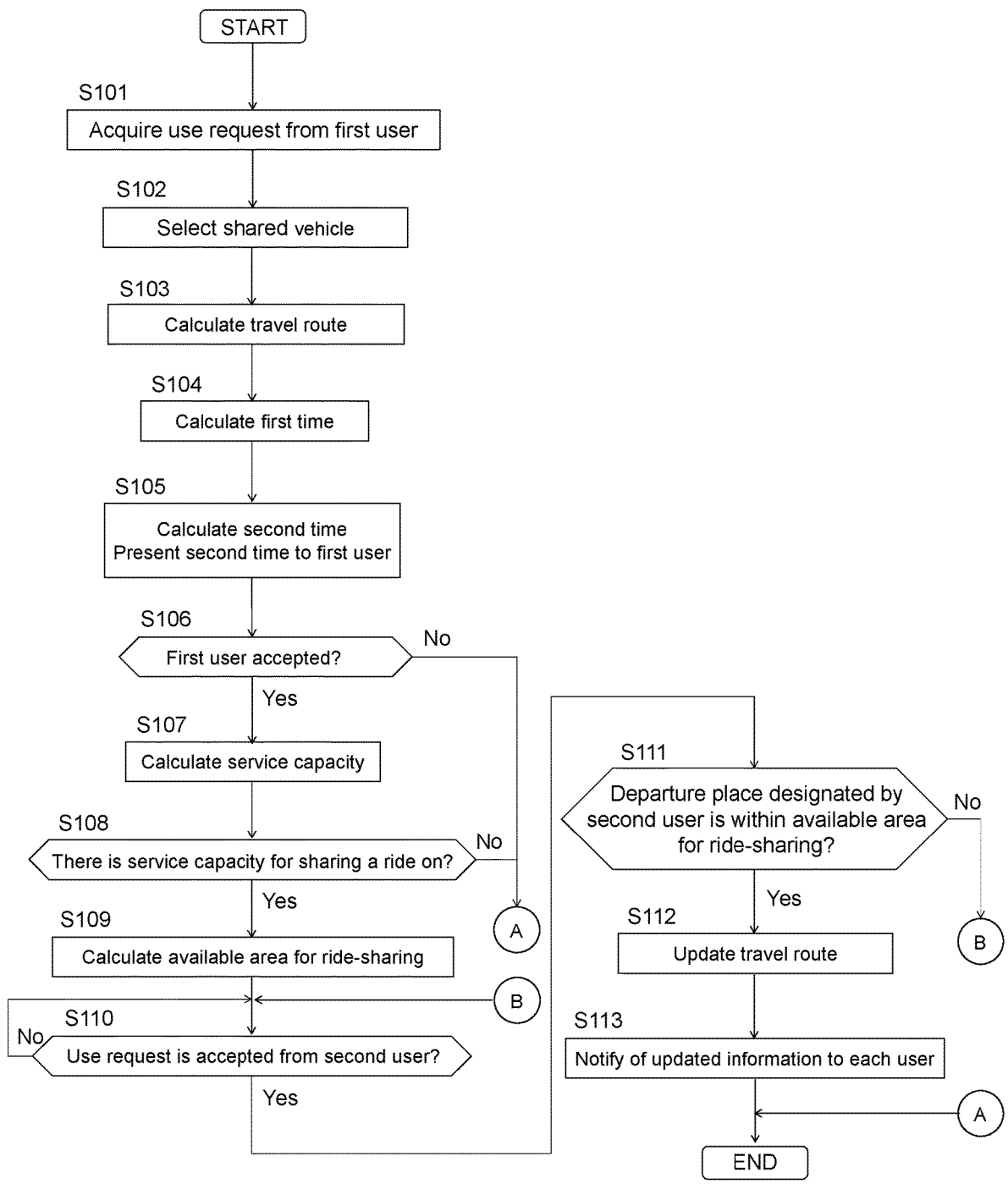
FIG. 6 is a flowchart showing a control procedure of the vehicle management system according to the present embodiment.

Incidentally, after the control in the step S113 shown in FIG. 6 is completed, the controller 10 may calculate an available area for ride-sharing again and make a third user who is different from the first user and the second user share a ride on. For example, after the control in step S113 shown in FIG. 6 is completed, the controller 10 may execute step S107 to step S109, and the controller 10 may wait in step S110.

Figure 7:
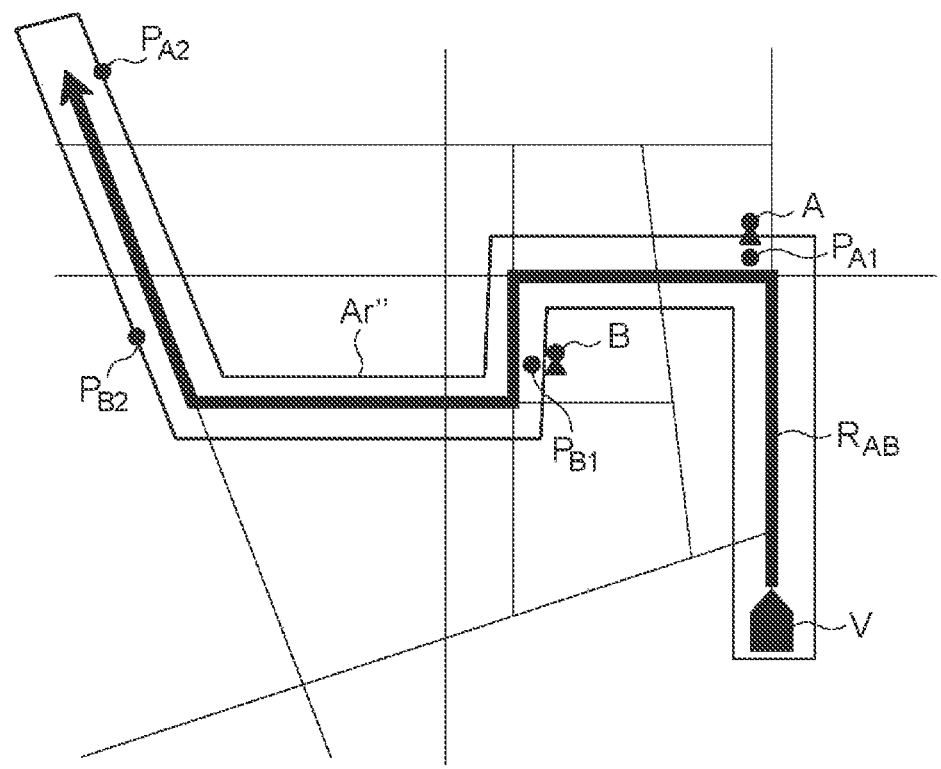
FIG. 7 is a diagram of a scene after a predetermined time has elapsed from the scene shown in FIG. 5, and is a diagram showing an example of an updated available area for ride-sharing.

FIG. 7 is a diagram of a scene after a predetermined time has elapsed from the scene shown in FIG. 5, and is a diagram showing an example of an updated available area for ride-sharing. The available area for ride-sharing $A_r''$ shown in FIG. 7 shows the available area for ride-sharing updated by the controller 10. After calculating the travel route $R_{AB}$, the controller 10 may calculate the service capacity again and calculate the multipliable area in accordance with the service capacity. Thus, when a use request by a third user who is different from the first user and the second user is accepted and the departure place designated by the third user is within the updated available area for ride-sharing, the third user can be shared a ride.

As described above, the vehicle management system according to the present embodiment comprises the controller 10 that accepts a use request for using the shared vehicle V from the user and manages vehicle dispatch of the shared vehicle V, and the database 20 that stores the use request including the departure place and the destination of the vehicle designated by the user. The controller 10 calculates the required time for the shared vehicle V to arrive at the destination designated by the first user who made the use request as the first time, calculates a time which is longer time than the first time and is a time to present to the first user, as a second time, calculates the time difference between the first time and the second time as the service capacity, calculates the available area for ride-sharing in which the shared vehicle V can be shared a ride based on the service capacity, accepts the use request from the second user different from the first user, and, when the departure place designated by the second user is within the available area for ride-sharing, the controller 10 has the shared vehicle V pass through the departure place designated by the second user. Thereby, even if the second user shares a ride on the shared vehicle V, the second user can get on the shared vehicle V while ensuring that the shared vehicle V arrives at the destination designated by the first user within the second time, and can restrain dissatisfaction of the first user and the second user. As a result, the opportunity for the user to use the system increases, and the vehicle dispatch efficiency can be improved.

Further, in the present embodiment, the data base 20 stores the usage history information 22 as a record when the user has used the shared vehicle Vin the past, and the usage history information 22 includes the satisfaction level of the user for the required time to the destination. The controller 10 calculates the second time based on the satisfaction level of the user who has used the shared vehicle V in the past. This allows the user to be presented with a second time based on the user's previous experience, which prevents the user from becoming unhappy even when the satisfaction level for the required time varies from user to user, while also restrain the user's dissatisfaction.

Further, in the present embodiment, when the first user has used the shared vehicle V a plurality of times in the past, the controller 10 selects usage histories in which the satisfaction level is equal to or larger than a predetermined value from the plurality of usage histories, and sets the longest required time among the required times included in the selected usage histories as the second time. This allows the second time to be as long as possible to the extent that it does not frustrate the first user. As a result, the expansion of the available area for ride-sharing leads to an increase in the number of opportunities for other users to share a ride, thereby improving the vehicle dispatch efficiency of the shared vehicle V.

In addition, in the present embodiment, the controller 10 calculates the travel route to the destination designated by the first user, and calculates the first time based on at least one of the traffic congestion information on the calculated travel route and on surrounding roads and the weather information. This improves the predictive accuracy of the required time to the destination.

Further, in the present embodiment, the controller 10 determines that it is possible for other users to share a ride on the shared vehicle V when the service capacity calculated by the service capacity calculation function exceeds a predetermined time. Thus, for example, even if the second time is at the same level as the first time due to decrease in the accuracy of the calculation of the second time, it can be prevented from making a wrong determination whether or not to share a ride on the shared vehicle V. As a result, it is possible to make an appropriate determination on whether or not to share a ride.

In the present embodiment, the available area for ride-sharing is an area within a range in which the required time to the destination designated by the first user does not exceed the second time when the second user sharing a ride on the shared vehicle V. Thus, since even if the second user is shared on a ride on the shared vehicle V, it is possible to prevent the dissatisfaction to the first user, as a result, it is possible to increase the opportunity to use the shared vehicle V.

In the present embodiment, when the departure place designated by the second user is within the available area for ride-sharing, the controller 10 calculates the travel route of the shared vehicle V to the destination designated by the second user through the departure place designated by the second user. Then, the controller 10 has the shared vehicle V travel the calculated travel route. As a result, the second user can ride on the shared vehicle V at the departure place designated by the second user, so that dissatisfaction with the second user can be prevented and the opportunity to use the shared vehicle V can be increased.

In the present embodiment, the database 20 stores the environment information 24 including the weather information, and the controller 10 corrects the second time based on at least one of the use time zone of the shared vehicle V and the weather when the shared vehicle V is used. For example, even in a limited time zone such as a lunch time, by correcting the second time to be shorter, it is possible to prevent the user from being dissatisfied by presenting unnecessarily long the required time to the user.

Second Embodiment

Next, a vehicle management system according to the present invention different from the above-described embodiment will be described. In the present embodiment, the configuration is the same as that of the vehicle management apparatus 100 of the above-described embodiment except that the second time calculation function of the controller 10 differs from that of the above-described embodiment, and therefore, the explanation of the above-described embodiment will be referred to for the similar configuration of the vehicle management apparatus 100.

The second time calculation function according to the present embodiment will be described. In the embodiment described above, the controller 10 calculates the second time based on the usage histories of the shared vehicle V used by the user who made the use request, but the user who uses the shared vehicle Vis not necessarily limited to having used experience in the past.

Therefore, in the present embodiment, the controller 10 uses second time calculation function to calculate the second time based on the usage histories of the shared vehicle V used by the user who is different from the user making a use request of the shared vehicle V. Specifically, in the present embodiment, the controller 10 extracts users who have used the shared vehicle V in the past in the same area as the area where the first user uses the shared vehicle V or in the surrounding area, and calculates the second time based on the usage histories of the shared vehicle V used by the extracted users.

For example, when the controller 10 receives a use request from a first user who has no experience in using the shared vehicle V, the controller 10 identifies the area where the first user uses the shared vehicle V from the departure and destination designated by the first user, and calculates the distance from the departure to the destination. Next, the controller 10 refers to the usage history information 22 in the database 20, and extracts users who have used the shared vehicle V in the past in the identified area or the surrounding area. The controller 10 can extract corresponding users in accordance with whether or not the departure place and the destination included in the usage history information 22 are within the range of the identified area.

When a plurality of users correspond to each other, the controller 10 extracts, from the usage histories of the plurality of users, usage histories including a travel distance that is substantially the same as the distance from the destination to the departure place designated by the first user. The controller 10 further selects the usage histories of which the satisfaction level is equal to or larger than a predetermined value, and calculates an average of the required time included in the selected usage histories. The travel time from the departure place to the destination in the second time is not limited to the average time, and may be, for example, the longest required time among a plurality of the required times. In the case of the longest travel time, this can lead to an expansion of the available area for ride-sharing and increase the opportunities for the other users to share on a ride.

The controller 10 also executes the same processing as the above-described processing for the waiting time at the departure place, as in the above-described embodiment. The controller 10 also uses the usage histories of the users who have used the shared vehicle V in the past in the area where the first user uses the shared vehicle V or in the surrounding area when calculating the waiting time in the second time. The explanation in the present embodiment and the explanation in the above-described embodiment are used as appropriate for the processing in the waiting time.

When the controller 10 calculates the travel time from the destination to the departure place and the waiting time at the departure place based on the usage histories of the users who have used the shared vehicle V in the past in the area where the first user uses the shared vehicle V or in the surrounding area, the controller 10 sets the time obtained by adding the two calculated times as the second time.

As described above, in the present embodiment, the controller 10 extracts users who have used the shared vehicle Vint the past in the same area as or in the surrounding area where the first user uses the shared vehicle V, and the controller 10 calculates the second time based on the satisfaction level of the extracted users. Thus, the second time based on the satisfaction level of the users who have used the shared vehicle V in the past in the same or surrounding areas can be presented to the first user. As a result, even if the first user has no experience in using the shared vehicle V, the second time can be presented as a reasonable the required time that is acceptable to the first user. For example, for a first user who has no experience in using a shared vehicle V, it is possible to suppress the presentation of an unnecessarily long required time, and to provide the user with services that do not fall below a predetermined level.

In the above-described embodiment, the method of using the usage histories of the shared vehicle V used by other users with reference to the area where the first user uses the shared vehicle V has been described, but, for example, the usage histories of the shared vehicle V used by other users may be used with reference to the attribute of the first user.

Next, a vehicle management system according to a variant example will be described. In the variant example, the usage histories of the shared vehicle V used by the users who have the same or similar attribute as those of the first user are used. For example, the controller 10 grasps the gender and age of the first user from the user's ID information included in the use request of the first user. Next, the controller 10 refers to the usage history information 22 in the database 20, and extracts users whose gender are the same as the gender of the first user and whose age is the same as or close to the age of the first user. The criteria for being close in age are not particularly limited. For example, users whose age difference is within a predetermined range from the age of the first user may be users whose age is close, or users whose age is the same as the age of the first user may be users whose age is close.

When a plurality of users correspond to each other, the controller 10 extracts, from the usage histories of the plurality of users, usage histories including a travel distance that is substantially the same as the distance from the destination to the departure place designated by the first user. The controller 10 further selects the usage histories of which the satisfaction level is equal to or larger than a predetermined value, and acquires an average of the required time or the longest required time included in the selected usage histories. The user extraction processing is not limited to using a condition in which the gender is the same as the gender of the first user and the age is the same as or close to the age of the first user. For example, users whose gender is different from the gender of the first user and whose age is the same as or close to the age of the first user may be extracted. For example, users whose gender is the same as the gender of the first user and whose age is different from the age of the first user may be extracted.

As described above, in the variant example, the controller 10 extracts users having the same or similar attribute as the attribute of the first user, and the controller 10 calculates the second time based on the satisfaction level of the extracted users. Thus, a second time based on the attributes of the first user can be presented to the first user. Thus, even if the first user has no experience in using the shared vehicle V, the second time can be presented as the required time calculated from a user who is close to the first user's sense. For example, it is possible to suppress the presentation to the first user of the required time that feels long from the sense of the first user, and to provide the user with services that do not fall below a predetermined level.

Third Embodiment

Next, a vehicle management system according to the present invention different from the above-described embodiment will be described. In the present embodiment, the configuration is the same as that of the vehicle management apparatus 100 of the above-described embodiment except that the second time calculation function of the controller 10 differs from that of the above-described embodiment, and therefore, the explanation of the above-described embodiment will be referred to for the similar configuration of the vehicle management apparatus 100.

The second time calculation function according to the present embodiment will be described. In the embodiment described above, the controller 10 calculates the second time based on the usage histories of the shared vehicle V, but for example, in an area in which the usage frequency of the shared vehicle Vis low, the second time is calculated based on the usage histories in another area, and as a result, the calculation accuracy of the second time may be lowered.

Therefore, in the present embodiment, the controller 10 uses second time calculation function to calculate the second time based on the usage histories of the moving means other than the shared vehicle V. Specifically, in the present embodiment, the controller 10 extracts users using a moving means other than the shared vehicle V in the same area as or in the surrounding area, and calculates the second time based on the usage histories of the moving means other than the shared vehicle V used by the extracted users.

For example, in an area where the use frequency of the shared vehicle Vis low, when the controller 10 receives a use request from a first user who has no experience in using the shared vehicle V, the controller 10 identifies the area where the first user uses the shared vehicle V from the departure and destination designated by the first user, and calculates the distance from the departure to the destination. Next, the controller 10 refers to the usage area information 23 in the database 20, and extracts users who have used a moving means other than the shared vehicle V in the past in the identified area or in the surrounding area. The controller 10 can extract corresponding users in accordance with whether or not the departure place and the destination included in the usage area information 23 are within the range of the identified area. Then, the controller 10 calculates the second time based on the usage histories when the extracted users have used the moving means other than the shared vehicle V in the past. Since the process of calculating the second time based on the usage histories is the same as that the above-described embodiment, the explanation given in the above-described embodiment is appropriately incorporated.

As described above, in the present embodiment, the controller 10 extracts users who have used a moving unit other than the shared vehicle V in the same area or in the surrounding area where the first user uses the shared vehicle V, and the controller 10 calculates the second time based on the satisfaction level of the extracted users. Thus, the second time based on the satisfaction level of the users who have used the moving means other than the shared vehicle V in the past in the same or surrounding areas can be presented to the first user. As a result, even if the first user who has no experience in using the shared vehicle V makes a use request in an area where the frequency of use of the shared vehicle Vis low, the second time can be presented as a reasonable the required time that is acceptable to the first user. For example, it is possible to suppress the presentation of unnecessarily long required time compared to the required time when moving by taxis or trains, and to provide with the user services that do not fall below a predetermined level.

It should be appreciated that the embodiments explained heretofore are described to facilitate understanding of the present invention and are not described to limit the present invention. It is therefore intended that the elements disclosed in the above embodiments include all design changes and equivalents to fall within the technical scope of the present invention.

For example, in the embodiments described above, the second time calculation method different for each embodiment has been described, but the second time may be calculated by combining the respective second time calculation methods. For example, the average time between the required time calculated by the method described in the second embodiment and the required time calculated by the method described in the variant example of the second embodiment may be set as the second time. Further, the second time may be calculated by adding the required time calculated by the methods described in the third embodiment to the object of the average time.

For example, in this specification, the vehicle management system according to the present invention has been described exemplifying the vehicle management system 1, but the present invention is not limited to this. In this specification, the controller according to the present invention has been described exemplifying the controller 10, but the present invention is not limited to this. In this specification, the database according to the present invention has been described exemplifying the database 20, but the present invention is not limited to this. In the present specification, the vehicle according to the present invention has been described exemplifying the shared vehicle V, but the present invention is not limited to this.

EXPLANATIONS OF LETTERS OR NUMERALS

1 . . . . Vehicle management system
100 . . . . Vehicle management apparatus
10 . . . . Controller
20 . . . . Database
30 . . . . Communication device
V1 to Vn . . . Shared vehicle
200V1 to 200Vn . . . Onboard device
300A to 300Y . . . User terminal device

The invention claimed is:
1. A vehicle management system for managing a plurality of vehicles shared by a plurality of users, the vehicle management system comprising:
a controller configured to accept a use request for using a vehicle from a user and manage vehicle dispatch; and
a database configured to store the use request including a departure place of the vehicle and a destination of the vehicle designated by the user;
wherein the controller is further configured to:
calculate a required time for the vehicle to arrive at the destination designated by a first user who has made the use request as a first time;
calculate a time which is a longer time than the first time and is a time to present to the first user, as a second time;
calculate a time difference between the first time and the second time as service capacity;
calculate a travel route from a current position of the vehicle to the destination through the departure place;

calculate an available area for ride-sharing, extended from the travel route according to a distance converted from a differential time; and accept the use request from a second user, and when the departure place designated by the second user is within the available area for ride-sharing, have the vehicle pass through the departure place designated by the second user.

2. The vehicle management system according to claim 1, wherein
the database stores usage histories of the vehicle as a record when the user has used the vehicle in a past,
the usage histories of the vehicle include a satisfaction level of the user for the required time,
the controller is further configured to calculate the second time based on the satisfaction level of the user who has used the vehicle in the past.

3. The vehicle management system according to claim 1, wherein
the database stores usage histories of the vehicle as a record when the user has used the vehicle in a past,
the usage histories of the vehicle include a satisfaction level of the user for the required time,
the controller is further configured to:
extract users who have used the vehicle in the past in a same area or in a surrounding area where the first user uses the vehicle; and
calculate the second time based on the satisfaction level of extracted users.

4. The vehicle management system according to claim 1, wherein
the database stores usage histories of the vehicle as a record when the user has used the vehicle in a past,
the usage histories of the user include a satisfaction level of the user for the required time and an attribute of the user,
the attribute of the user includes age and gender of the user,
the controller is further configured to:
extract users having a same or similar attribute as the attribute of the first user; and
calculate the second time based on the satisfaction level of extracted users.

5. The vehicle management system according to claim 1, wherein
the database stores usage histories of a moving means other than the vehicle as a record when the user has used the moving means other than the vehicle in a past,
the usage histories of the moving means other than the vehicle includes a satisfaction level of the user for the required time,
the controller is further configured to:
extract users who have used a moving means other than the vehicle in the past in a same area or in a surrounding area where the first user uses the vehicle; and
calculate the second time based on the satisfaction level of extracted users.

6. The vehicle management system according to claim 2, wherein the controller is further configured to:
extract the usage histories including the satisfaction level that is larger than a predetermined threshold; and
set longest required time among required times included in extracted usage histories as the second time.

7. The vehicle management system according to claim 3, wherein the controller is further configured to:

further extract users having the satisfaction level that is larger than a predetermined threshold; and
set longest time among required times when the extracted users have used the vehicle, as the second time.

8. The vehicle management system according to claim 1, wherein
the database stores a road information and a weather information,
the controller is further configured to:
calculate a travel route of the vehicle to the destination; and
calculate the first time based on at least one of the road information on the travel route and on a surrounding route and the weather information.

9. The vehicle management system according to claim 1, wherein
the controller is further configured to determine whether it is possible for other users to share a ride on the vehicle when the service capacity exceeds a predetermined time.

10. The vehicle management system according to claim 1, wherein
the available area for ride-sharing is an area within a range in which the required time to the destination designated by the first user does not exceed the second time when the second user is shared a ride on the vehicle.

11. The vehicle management system according to claim 1, wherein the controller is further configured to:
calculate a travel route of the vehicle to the destination designated by the first user through the departure place designated by the second user, when the departure place designated by the second user is within the available area for ride-sharing; and
have the vehicle travel the travel route calculated by the controller.

12. The vehicle management system as claimed in claim 1, wherein
the database is further configured to store weather information,
the controller is further configured to correct the second time based on at least one of use time zone of the vehicle and weather when the vehicle is used.

13. A vehicle management method for managing vehicle dispatch using a controller configured to manage a plurality of vehicles shared by a plurality of users and a database configured to store a use request including a departure place and a destination of a vehicle designated by a user, the vehicle management method comprising:
calculating a required time for the vehicle to arrive at the destination designated by a first user who made the use request as a first time;
calculating a time which is a longer time than the first time and is a time to present to the first user, as a second time;
calculating a difference time between the first time and the second time as a service capacity;
calculating a travel route from a current position of the vehicle to the destination through the departure place;
calculating an available area for ride-sharing, extended from the travel route according to a distance converted from a differential time; and
accepting the use request from a second user, and when the departure place designated by the second user is within the available area for ride-sharing, having the vehicle pass through the departure place designated by the second user.

* * * * *